(12) United States Patent
Zami

(10) Patent No.: US 6,901,184 B2
(45) Date of Patent: May 31, 2005

(54) FREQUENCY COMB FOR AN OPTICAL WDM NETWORK

(75) Inventor: Thierry Zami, Massy (FR)

(73) Assignee: Alcatel, Paris (FR)

( * ) Notice: Subject to any disclaimer, the term of this patent is extended or adjusted under 35 U.S.C. 154(b) by 101 days.

(21) Appl. No.: 10/626,542

(22) Filed: Jul. 25, 2003

(65) Prior Publication Data

US 2005/0036734 A1 Feb. 17, 2005

(30) Foreign Application Priority Data

Sep. 12, 2002 (FR) .............................................. 02 11307

(51) Int. Cl.⁷ .............................. G02B 6/00; G02B 6/24
(52) U.S. Cl. ......................................... 385/24; 359/43
(58) Field of Search ............................. 385/14–16, 24, 385/43, 147; 398/9, 79, 75, 98, 182–183

(56) References Cited

U.S. PATENT DOCUMENTS

| | | | | |
|---|---|---|---|---|
| 6,331,907 | B1 * | 12/2001 | Miyazaki et al. ............... | 398/9 |
| 6,341,022 | B1 * | 1/2002 | Leclerc et al. ................. | 398/79 |
| 6,392,991 | B1 * | 5/2002 | Yamamoto et al. ......... | 370/222 |
| 6,587,242 | B1 * | 7/2003 | Shake et al. ................... | 398/98 |
| 2003/0165341 | A1 * | 9/2003 | Bulow .......................... | 398/75 |
| 2003/0170035 | A1 * | 9/2003 | Kisaka et al. ............... | 398/183 |

FOREIGN PATENT DOCUMENTS

| EP | 0 849 968 A2 | 6/1998 |
|---|---|---|
| WO | WO 99/45420 | 9/1999 |

OTHER PUBLICATIONS

Xin Miao, "Unequally spaced channels for upgrading WDM system from 3–channel to 10–channel preserving no FWM corsstalk", Optical Fiber Technology, Academic Press, London, US, vol. 4, No. 2, pp. 347–350, XP002080085.

F. Forghieri et al, "Reduction of Four–wave Mixing Crosstalk in WDM Systems Using Unequally Spaced Channels", IEEE Photonics Technology Letters, IEEE, Inc. NY, US, vol. 6, No. 1, Jun. 1, 1994, pp. 754, 756, XP000457239.

Y. Hamazumi et al, "Experiments on 4 × 4 port optical path cross–connection with 8 × 2.5 gbit/s transportation employing unequal channel spacing", OFC–96 Technical Digest, Feb. 25, 1996, pp. 263–264, XP010539982.

M. Fakumi et al, "Experimental Verification of Cascadability of 12 Channel × 2.5 Gb/s WDM Add/drop Multiplexer Employing Unequally–spaced Arrayed–waveguide Grating", ECOC–96, vol. 4, Sep. 15, 1996, pp. 103–106, XP010303172.

* cited by examiner

Primary Examiner—Akm Enayet Ullah
(74) Attorney, Agent, or Firm—Sughrue Mion, PLLC

(57) ABSTRACT

In order to reduce the effects of non-linear phenomena in WDM optical transmission networks, the optical carrier frequencies of the multiplex signals belong to a comb of frequencies that are spectrally spaced apart in irregular manner while nevertheless belonging to a chart of optical frequencies that are spectrally spaced apart in regular manner at a pitch df. These frequencies are selected in such a manner as to enable them to be dropped from the multiplexed signals by N respective periodic optical filtering operations having the same free spectrum interval (Df) equal to M.df, where M is an integer greater than or equal to N, the filtering operations enabling N consecutive frequencies to be dropped from the chart. In addition, the spacing between any pair of frequencies of the comb is different from any integer multiple greater than or equal to 1 of the free spectrum interval (Df).

10 Claims, 2 Drawing Sheets

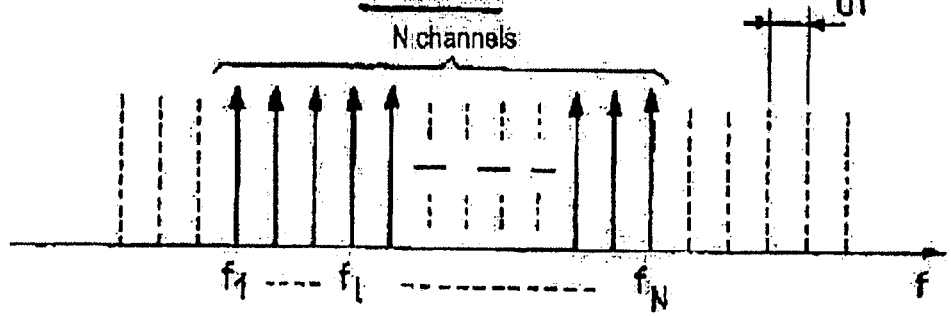
FIG_1
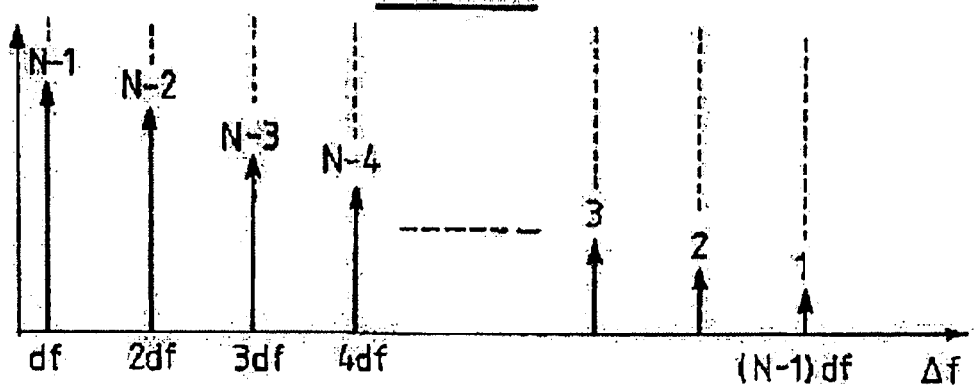
FIG_2
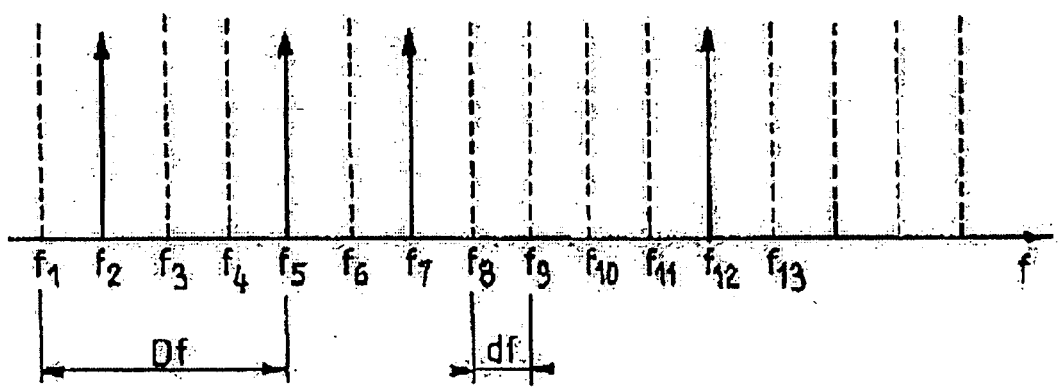
FIG_3

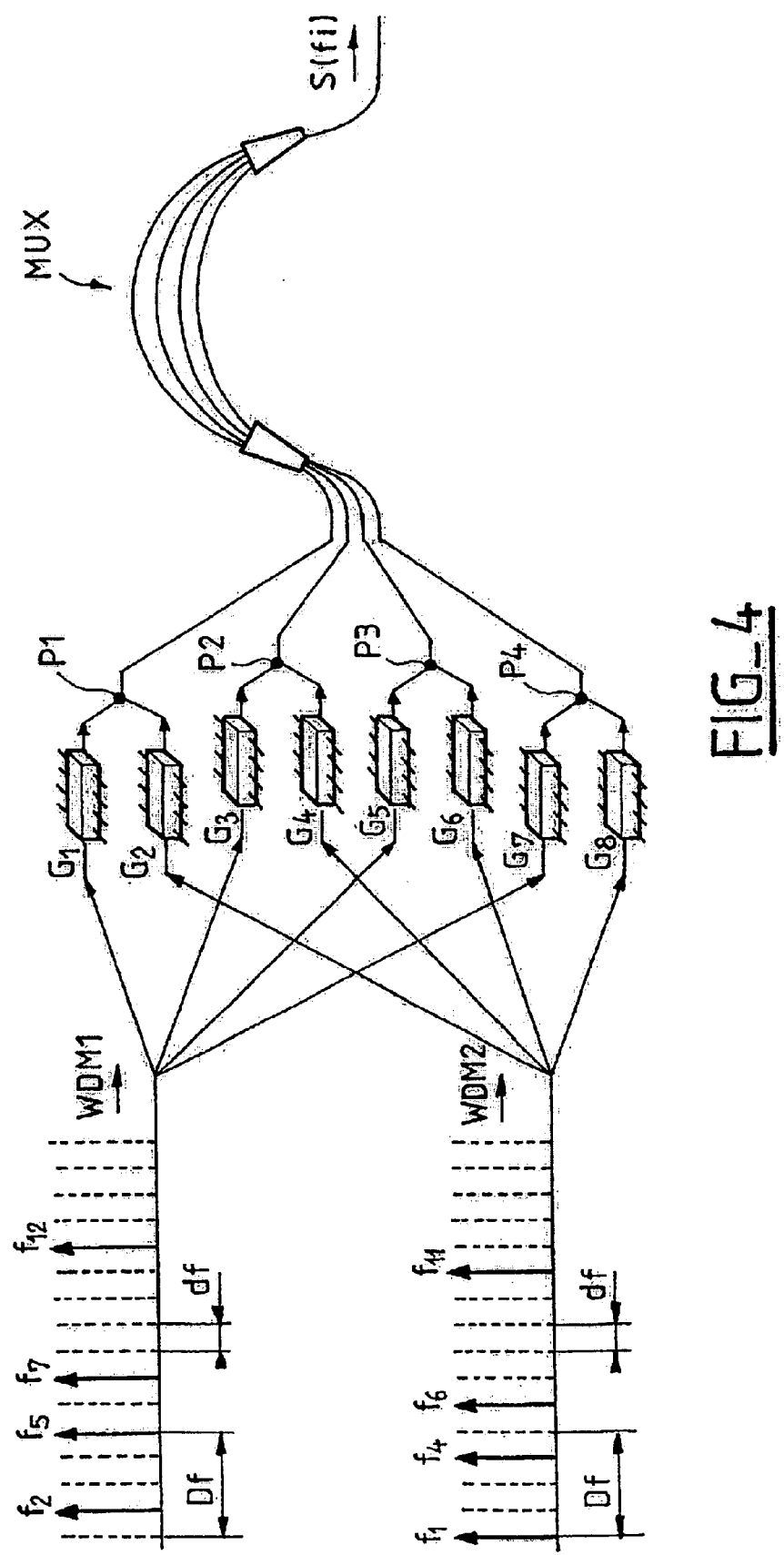
FIG_4

FREQUENCY COMB FOR AN OPTICAL WDM NETWORK

The invention relates to the field of optical transmission systems and networks, and more particularly to those which implement wavelength division multiplexing (WDM) which can also be referred to as "multiplexing by optical frequency distribution".

A WDM signal comprises a combination of optical signals each constituted by an optical carrier wave modulated as a function of information to be transmitted. Each carrier wave possesses an optical frequency fi (or wavelength) that is specific thereto and that enables a corresponding spectrum channel to be defined.

In order to rationalize the implementation of WDM optical systems so as to make it possible to use components (laser sources, filters, . . . ) produced by a variety of manufacturers, the optical frequencies used as carriers have been standardized. Thus, the International Telecommunications Union (ITU) has defined standard charts of regularly spaced apart carrier frequencies.

At present, depending on the chart under consideration, the pitch of the chart, i.e. the spacing df between the frequencies of two adjacent channels can be 50 gigahertz (GHz), 100 GHz, 200 GHz, or 400 GHz. FIG. 1 shows such an optical frequency allocation chart with channels symbolized by vertical line segments arranged along a frequency axis f.

In order to make up an N-channel WDM, it is generally desirable to minimize the amount of spectrum occupied by the multiplex signals conveyed in the network. Under such circumstances, and as shown in FIG. 1, N consecutive carrier frequencies f1, . . . , fi, . . . , fN are selected (symbolized by vertical arrows), from one of the standard charts (symbolized by vertical dashed line segments) at a pitch df which is large enough to provide sufficient spectral separation between channels, i.e. a pitch df that is not less than the amount of spectrum occupied by each channel (which depends directly on the modulation frequency and on its format).

The transmission of optical signals in optical fibers and various other pieces of equipment in optical networks leads to losses that make it necessary in particular to introduce amplifiers for compensating such losses. However, in order to reduce the cost of networks, it is also desirable to limit the number of amplifiers that are installed, which means that it is necessary to maximize the output powers from said amplifiers. Unfortunately, increasing power comes up against a limit due to various non-linear phenomena which occur in fibers and certain components of networks. In particular, optical gates which are in widespread use in optical switches are based on semiconductor optical amplifiers which present behavior that is highly non-linear.

A non-linear phenomenon that is specific to signals that are multiplexed by optical frequency distribution is the phenomenon known as four-wave mixing (FWM). As is well known, this phenomenon can lead to cross-talk between channels when their frequencies are regularly spaced apart.

Thus, making up a multiplex in compliance with a chart that is standardized and optimized from the point of view of spectrum occupancy, as described above, can be incompatible with increasing power, if the resulting four-wave mixing leads to excessive signal degradation. In particular, the effects of this phenomenon are particularly penalizing when the spectral spacing between channels is small.

In order to avoid this phenomenon, limiting power levels or increasing spectrum gaps between channels would lead to increasing cost and/or under-using the passband of networks. For equal performance, if the output power from amplifiers is reduced, it becomes necessary to increase the number of amplifiers. Furthermore, given the fact that the spectrum width of a WDM must always be limited in practice, at best by the passband of the links and in particular by that of the amplifiers, if the spectrum intervals are to be increased, then the number N of channels must be decreased, and consequently the total data rate conveyed by the network is reduced.

This problem is raised in the article entitled "Reduction of four-wave mixing cross-talk in WDM systems using unequally spaced channels", by Fabrizio Forrghieri et al., in IEEE Photonics Technology Letters, Vol. 6, No. 6, June 1994, pp. 754–756. That article shows that it is possible to find combs of N carrier frequencies that are irregularly distributed in a chart, such that all cross-talk by four-wave mixing is avoided and such that the resulting increase in spectrum width is minimized. A first condition is that the spacing between the frequencies of any pair of channels should be different from the spacing between the frequencies of any other pair. Thereafter, of those combs which satisfy the first condition, a comb should be selected in which the spectrum presents the smallest total width. Combs satisfying those two conditions can be found as solutions to a linear programming problem of conventional type.

Although that solution completely solves the problem of four-wave mixing, it does not take account of problems associated with extracting channels from the multiplex, i.e. demultiplexing the WDM signal.

In principle, an extraction or "drop" operation consists in coupling the WDM signal to the input of a filter set on the frequency of the channel that is to be dropped. To drop N channels at a time, it is possible to use N separate filters each coupled to the WDM signal. It is also possible to replace the filters by a demultiplexer designed to have N outputs set respectively on the N frequencies of the multiplex. To be able to drop any one selected channel, it is also possible to use a 1 to N space-division switch whose outputs are coupled respectively to the N inputs of a multiplexer, the N inputs being set respectively on the N frequencies of the multiplex.

Solutions based on multiplexers or demultiplexers are preferable since they give rise to a smaller amount of loss than occurs in filters. However they constitute solutions that are economically acceptable only insofar as it is possible to use components that are commonly available on the market, such as arrayed waveguide gratings (AWG) or "phasars". In general, the demultiplexers that are manufactured industrially are designed to select N frequencies f1, . . . , fN that are regularly spaced apart as in the standard charts as shown in FIG. 1. With such a comb, a distribution of frequency spacing values Δf is obtained as shown in FIG. 2: the spacing df occurs N−1 times, the spacing 2 df occurs N−2 times, etc.

In contrast, by adopting the solution set out in the above-specified article, uniform distribution of frequency spacing values is obtained, but in order to drop channels, that requires special demultiplexers or demultiplexers of very large dimensions. Furthermore, the N frequencies extend over a greater width of spectrum.

An object of the invention is to remedy those drawbacks by proposing a multiplex structure of the optical carrier frequency comb type having the property of limiting the effects of four-wave mixing, while enabling channels to be dropped, in compliance with said combs and by means of demultiplexers that are simple and inexpensive.

To this end, the invention proposes a compromise which consists in selecting from the frequencies of a standard type of chart those frequencies which are not regularly spaced apart, but without attempting to solve the problem of four-wave mixing in full. However, the frequencies are selected in such a manner as to be able to take advantage of the periodic property of the optical filter functions presented by ordinary demultiplexers and multiplexers.

More precisely, the invention provides a comb of optical carrier wave frequencies allocated respectively to N spectrum channels constituting an optical multiplex signal, said comb frequencies being spectrally spaced apart in irregular manner while all belonging to an optical frequency allocation chart that is spectrally spaced apart in regular manner at a pitch df, the comb being characterized in that said comb frequencies are selected in such a manner as to enable them to be dropped from said multiplex signal by N respective periodic optical filtering operations having the same free spectrum interval equal to M.df, where M is an integer equal to or greater than N, said filtering operations enabling N consecutive frequencies of the chart to be dropped, and in that the spacing between any pair of frequencies of said comb is different from any integer multiple greater than or equal to 1 of said free spectrum interval.

By selecting N carrier frequencies satisfying those criteria for constituting a multiplex, channel extraction can be performed by means of a single conventional regular demultiplexer having one input and N outputs, such as an array waveguide demultiplexer.

A demultiplexer of this type has the property whereby its transmittance relative to the input for each of its N outputs presents a common free spectrum interval. It is therefore equivalent to N periodic optical filters each presenting the same free spectral interval. To extract the N frequencies in accordance with the invention, a demultiplexer is thus selected that has N outputs set on N consecutive frequencies of the chart and presenting the free spectrum interval df of the invention, i.e. equal to M.df where M is an integer multiple that is necessarily greater than or equal to N. This condition ensures that the demultiplexer can spatially separate N consecutive frequencies of the chart. Since the N carrier frequencies of the invention are also such that the spacing between any two of them is different from any integer multiple greater than or equal to 1 of the free spectrum interval df, the demultiplexer can also spatially separate these N carrier frequencies.

Advantageously, the values of the spacings between pairs of frequencies of the comb are not all distinct. Thus, the irregular spacing of the channel frequencies on the chart leads to limiting the consequences of four-wave mixing, but the fact of accepting spacing between the frequencies of certain pairs of channels that are equal to the spacing between the frequencies of other pairs of channels means that full immunity to said phenomenon is not guaranteed. However, it does make it possible to find more combs that satisfy the criteria of the invention, and in particular combs of spectrum width that is smaller than is the case for combs made up of the same number of channels and that are completely insensitive to four-wave mixing.

Nevertheless, in practice, it is appropriate to seek an optimum compromise between spectrum width and the degree of insensitivity to four-wave mixing. To do this, it is possible to evaluate the magnitude of the effects of four-wave mixing as a function of the distribution of spacing values between the frequencies of combs satisfying the above criteria by simulating of transmission through conventional non-linear media. By setting a limit for these effects, it is possible to deduce an additional condition for imposing on the frequencies of the comb.

Thus, according to another advantageous characteristic of the invention, it has been found that the frequencies of the comb should preferably be selected in such a manner that the spacings between pairs of said frequencies do not take on the same value more than 5N/9 times.

According to another characteristic of the invention, M=N. This condition has the effect of making it possible to find combs having a spectrum width that is minimized for given values of df and of N. This also implies that the above-mentioned demultiplexer adapted for extracting the channels is a cyclical demultiplexer. Since demultiplexers of this type are also commonplace components, this condition does not have any undesirable consequences concerning the cost of dropping channels.

The invention also provides an optical multiplex signal made up of N spectral channels having allocated thereto N respective optical carrier wave frequencies belonging to a comb as defined above.

The invention also provides an optical transmission array using optical frequency distribution multiplexing for conveying at least one optical multiplex signal made up of N spectral channels to which there are allocated N respective optical carrier wave frequencies belonging to a comb as defined above.

Advantageously, in such an array, provision is made for a plurality of multiplex signals to be associated with a respective plurality of mutually different combs. This disposition is advantageous for limiting problems of cross-talk between channels in optical routers where frequency selectors receive a plurality of multiplex signals.

Other aspects and advantages of the invention appear in the following description given with reference to the figures.

FIG. 1 shows an optical frequency chart and is described above.

FIG. 2 shows the distribution of frequency spacing values for a conventional optical frequency comb.

FIG. 3 shows an example of an optical frequency comb of the invention.

FIG. 4 shows an optical router element for a WDM network in accordance with the invention.

FIG. 3 shows an example of an optical frequency comb in accordance with the invention for the particular case where N=4.

The optical frequency chart has a pitch df and comprises frequencies f1, f2, ..., f13, ... represented by vertical line segments disposed along a frequency axis f. To make up the comb, the four frequencies selected are f2, f5, f7, and f12 as symbolized by vertical arrows.

The comb is devised so as to define a free spectrum interval Df equal to 4df, while satisfying the condition that the spacing between any pair of frequencies of the comb is different from any integer multiple greater than or equal to 1 of the free spectrum interval 4df.

In this example, the frequencies of the comb are selected in such a manner as to enable them to be dropped from a multiplex signal by means of a cyclical demultiplexer having four outputs set on four consecutive frequencies of the chart and presenting the free spectrum interval 4df.

For other values of N, it is still possible to find frequency values and a free spectrum interval Df that can satisfy the conditions of the invention. To make it easy to find such values, it is possible to use conventional linear programming methods.

FIG. 4 shows how multiplex combs of the invention can be used in an optical transmission network that makes use of optical frequency distribution multiplexing and that is adapted to such combs.

The apparatus shown serves to drop selectively any one of the channels S(fi) belonging to any one two received multiplex signals WDM1, WDM2.

In this example, each multiplex signal has four spectrum channels which are allocated to four respective optical carrier wave frequencies belonging to a comb of the invention. Thus, the comb of the multiplex WDM1 is made up of the frequencies f2, f5, f7, and f12, while the comb of the multiplex WDM2 is made up of the frequencies f1, f4, f6, and f11.

The apparatus includes a periodic multiplexer MUX such as an AWM and it is provided with four inputs P1 to P4 set respectively on the four frequencies f1, f2, f3, and f4, with a free spectrum interval Df selected to be equal to 4df. This is thus a cyclical periodic multiplexer whose four inputs are set respectively on the four frequencies f1, f2, f3, and f4, modulo 4df.

Each of the four inputs is disposed so as to receive a fraction of each of the multiplex signals WDM1 and WDM2 via optical gates G1–G8. Thus, to drop any one of the channels S(fi) belonging to either one of the two multiplex signals WDM1 and WDM2, it suffices to activate one of the optical gates. In this example, the gates G1 to G8 make it possible to drop the frequencies f5, f1, f2, f6, f7, f11, f12, and f4, respectively.

It should be observed that a single periodic multiplexer can be used to drop the multiplexes associated with different combs of the invention. With apparatus of the type shown in FIG. 4, in particular, the fact of selecting different combs presents the advantage of reducing the risks of cross-talk at the inputs of the multiplexer due to imperfect isolation of the optical gates.

The frequency selector apparatus of FIG. 4 can easily be generalized for combs of the invention comprising an arbitrary number N of frequencies, and for an arbitrary number of input multiplex signals.

This apparatus can constitute a basic element for making up an optical router or a WDM photonic switching matrix. To do this, it suffices to provide a plurality of said apparatuses for each output of the matrix and to couple their outputs to the associated output of the matrix.

What is claimed is:

1. A comb of optical carrier wave frequencies allocated respectively to N spectrum channels constituting an optical multiplex signal, said comb frequencies being spectrally spaced apart in irregular manner while all belonging to an optical frequency allocation chart that is spectrally spaced apart in regular manner at a pitch df, the comb being characterized in that said comb frequencies are selected in such a manner as to enable them to be dropped from said multiplex signal by N respective periodic optical filtering operations having the same free spectrum interval (Df) equal to M.df, where M is an integer equal to or greater than N, said filtering operations enabling N consecutive frequencies of the chart to be dropped, and in that the spacing between any pair of frequencies of said comb is different from any integer multiple greater than or equal to 1 of said free spectrum interval (Df).

2. A comb according to claim 1, characterized in that the values of the spacing between pairs of frequencies of said comb are not all distinct.

3. A comb according to claim 2, characterized in that the spacings between pairs of frequencies of said comb do not take on the same value more than 5N/9 times.

4. A comb according to claim 1, characterized in that M=N.

5. An optical multiplex signal constituted by N spectrum channels allocated respectively to N optical carrier wave frequencies that are spectrally spaced apart in irregular manner while all belonging to a chart of optical frequencies that are spectrally spaced apart in regular manner at a pitch df, the signal being characterized in that said N optical carrier wave frequencies belong to a comb whose frequencies are selected in such a manner as to enable them to be dropped from said multiplex signal by N respective periodic optical filtering operations having the same free spectrum interval (Df) equal to M.df, where M is an integer greater than or equal to N, said filtering operations enabling N consecutive frequencies of the chart to be dropped, and in that the spacing between any pair of frequencies of said comb is different from any integer multiple greater than or equal to 1 of said free spectrum interval (Df).

6. A multiplex signal according to claim 5, characterized in that the spacing values between pairs of frequencies of said comb are not all distinct.

7. A multiplex signal according to claim 6, characterized in that the spacings between pairs of frequencies of said comb do not take on the same value more than 5N/9 times.

8. A multiplex signal according to claim 5, characterized in that M=N.

9. An optical transmission network using multiplexing by optical frequency distribution to convey at least one optical multiplex signal (WDM1, WDM2) constituted by N spectrum channels allocated respectively to N optical carrier wave frequencies, the network being characterized in that said N optical carrier wave frequencies belong to a comb according to claim 1.

10. An optical transmission network according to claim 9, characterized in that at least two of said multiplex signals (WDM1, WDM2) are associated respectively with at least two of said combs, said combs being mutually different.

* * * * *